INVENTOR.
JOHN T. MULLER
BY
MORGAN, FINNEGAN, DURHAM & PINE
ATTORNEYS

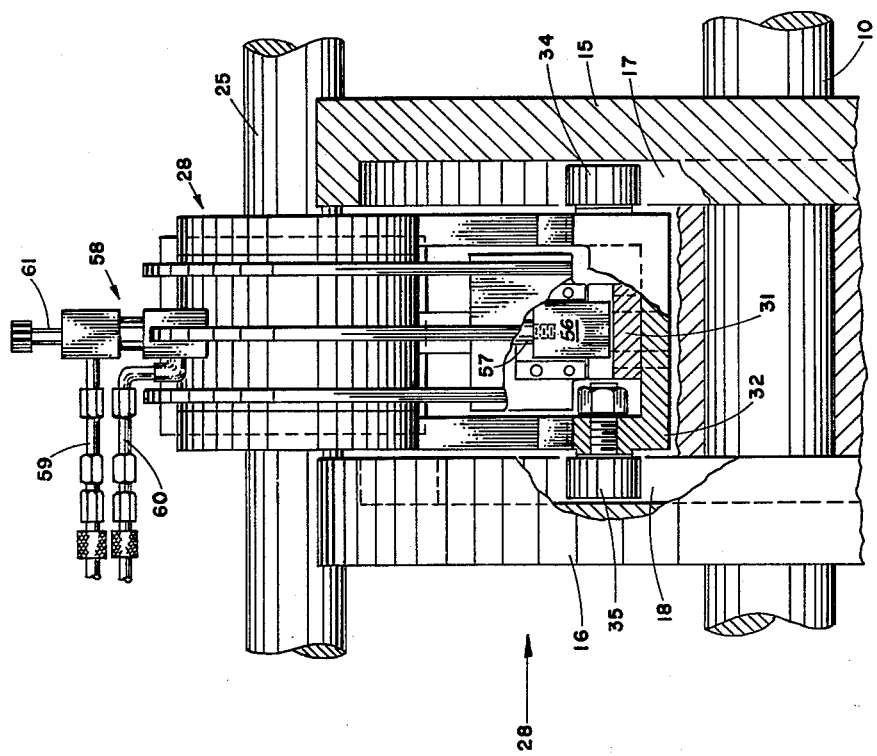

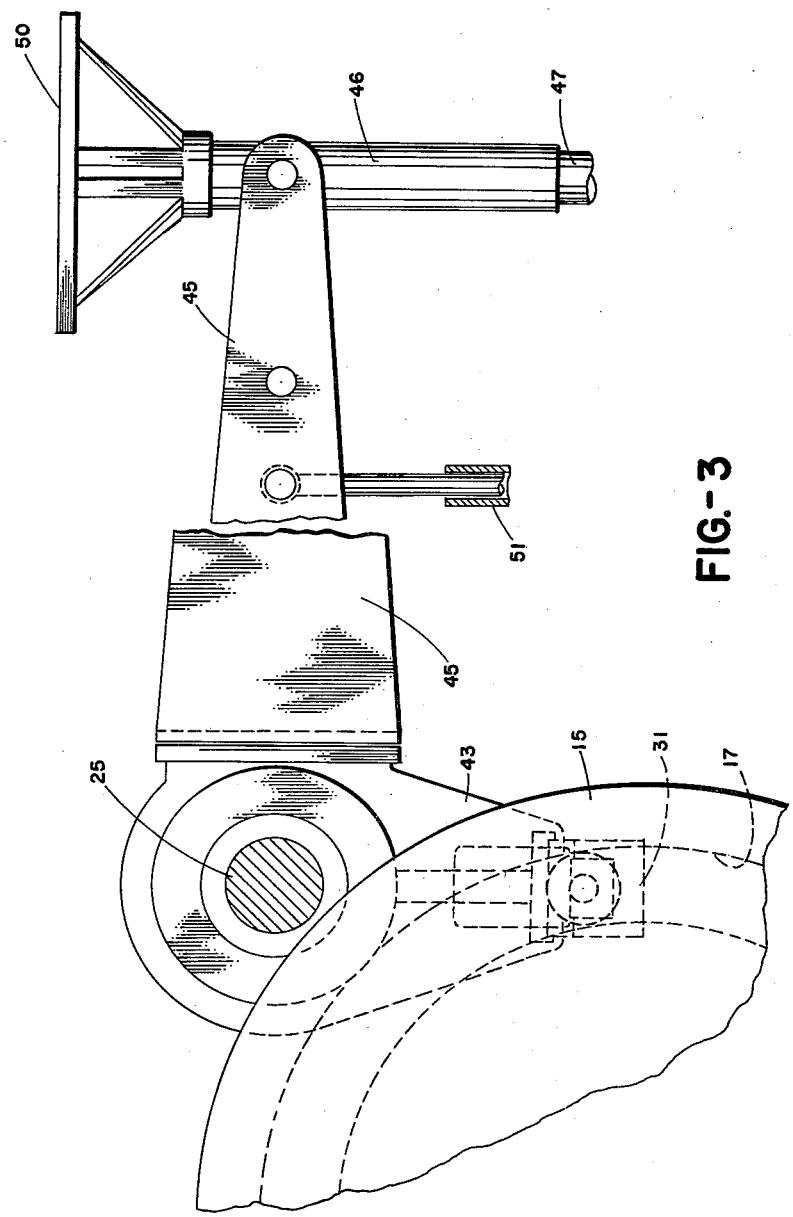

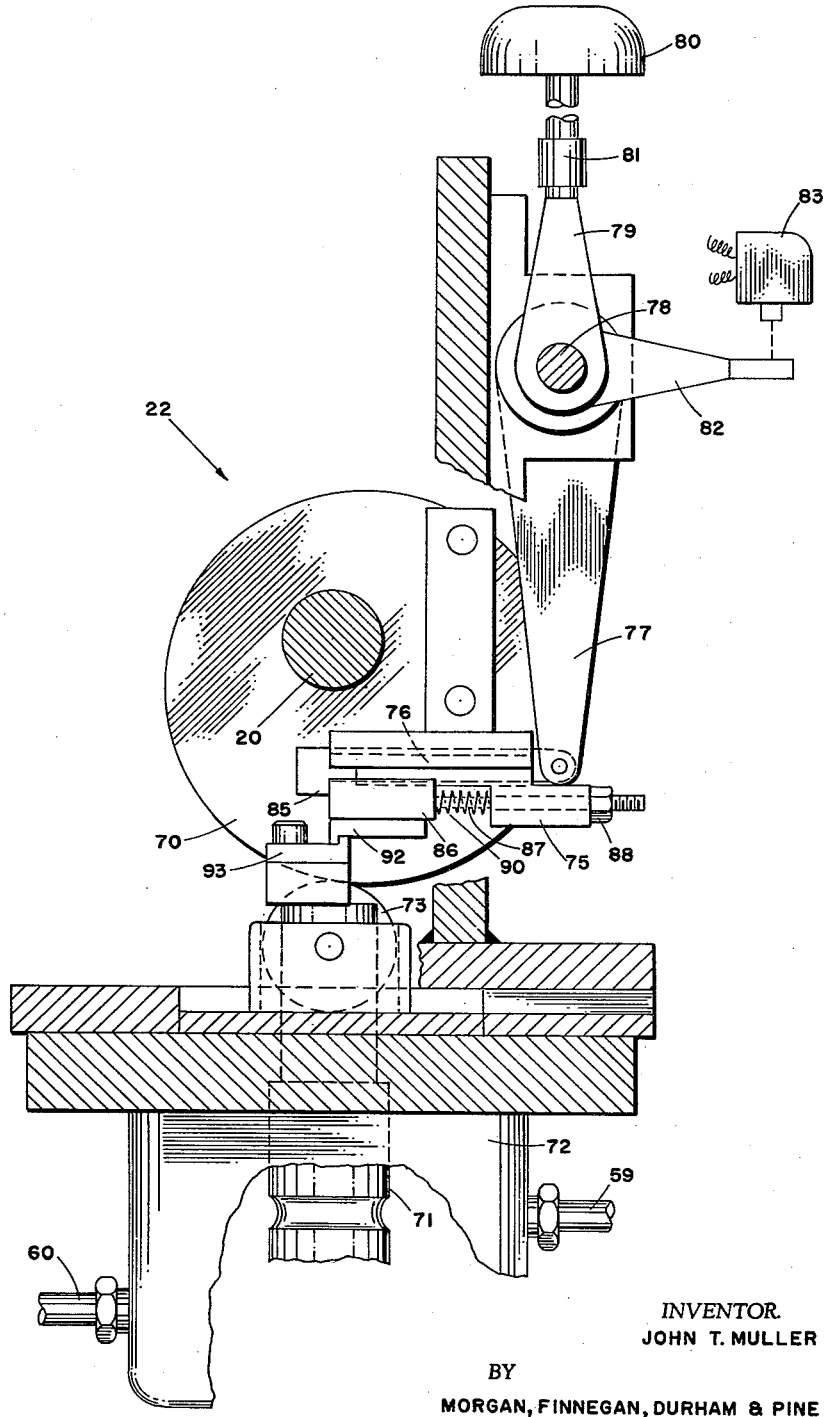

July 6, 1965   J. T. MULLER   3,192,762
CONTROLLED MOTION SHOCK TESTING
Filed Jan. 15, 1963   5 Sheets-Sheet 5
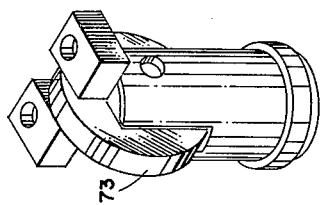
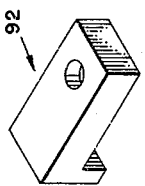
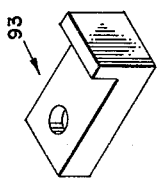
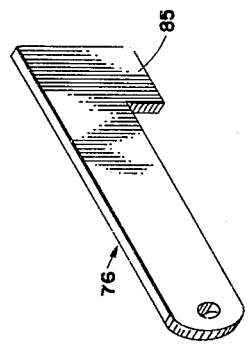
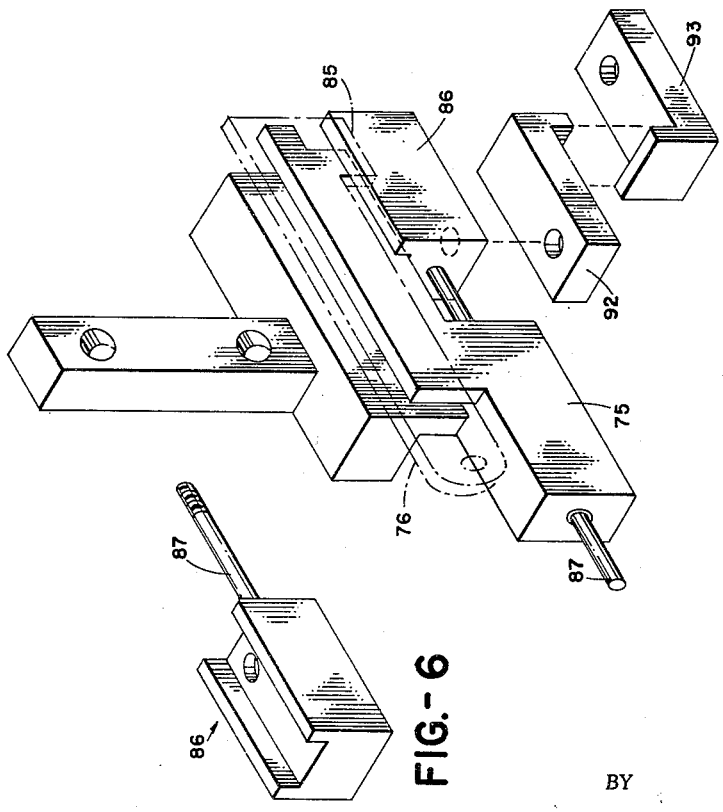
INVENTOR.
JOHN T. MULLER
BY
MORGAN, FINNEGAN, DURHAM & PINE
ATTORNEYS

United States Patent Office 3,192,762
Patented July 6, 1965

3,192,762
CONTROLLED MOTION SHOCK TESTING
John T. Muller, Box 32, Livingston, N.J.
Filed Jan. 15, 1963, Ser. No. 251,648
12 Claims. (Cl. 73—12)

This invention relates to and has for its objects, improvements in shock testing apparatus of the type disclosed in applicant's prior copending application Serial No. 707,218, filed January 6, 1958 and entitled Method and Apparatus for Controlled Motion Shock Testing, now Patent No. 3,073,148, issued January 15, 1963.

The shock testing technique demonstrated in applicant's cited patent involves the determination of data descriptive of a required displacement of the object under test which when executed will impart the desired shock and other restoring forces thereto; this data is set into the apparatus, illustratively in data storage means embodied as a cam track; the energy for displacing the object, which is provided in the illustrated embodiment by a rotary mass, is controllably fed thereto under the control of the data stored in the cam track, supplementary control being provided by timing means. It is a specific object of the present invention to effect substantial improvements in simplicity, reliability and durability of the above described arrangement particularly in the energy transfer and timing means.

Other objects and advantages of the invention will be set forth in part hereinafter and in part will be obvious herefrom, or may be learned by practice with the invention, the same being realized and attained by means of the parts, instrumentalities, combinations and improvements pointed out in the appended claims.

The invention consists in the novel parts, constructions, arrangements, combinations and improvements herein shown and described.

Serving to illustrate an exemplary embodiment of the invention are the drawings of which:

FIGURE 2 is an elevational and partly sectional view of the cam and engaging mechanism;

FIGURE 3 is an elevational and partly sectional view of the subject matter of FIGURE 2 together with the platform arrangement for carrying the object under test;

FIGURE 4 is an elevational and partly sectional view of certain control and timing components, and FIGURES 5-10 are perspective detail views of the components of FIGURE 4.

Figure 1:
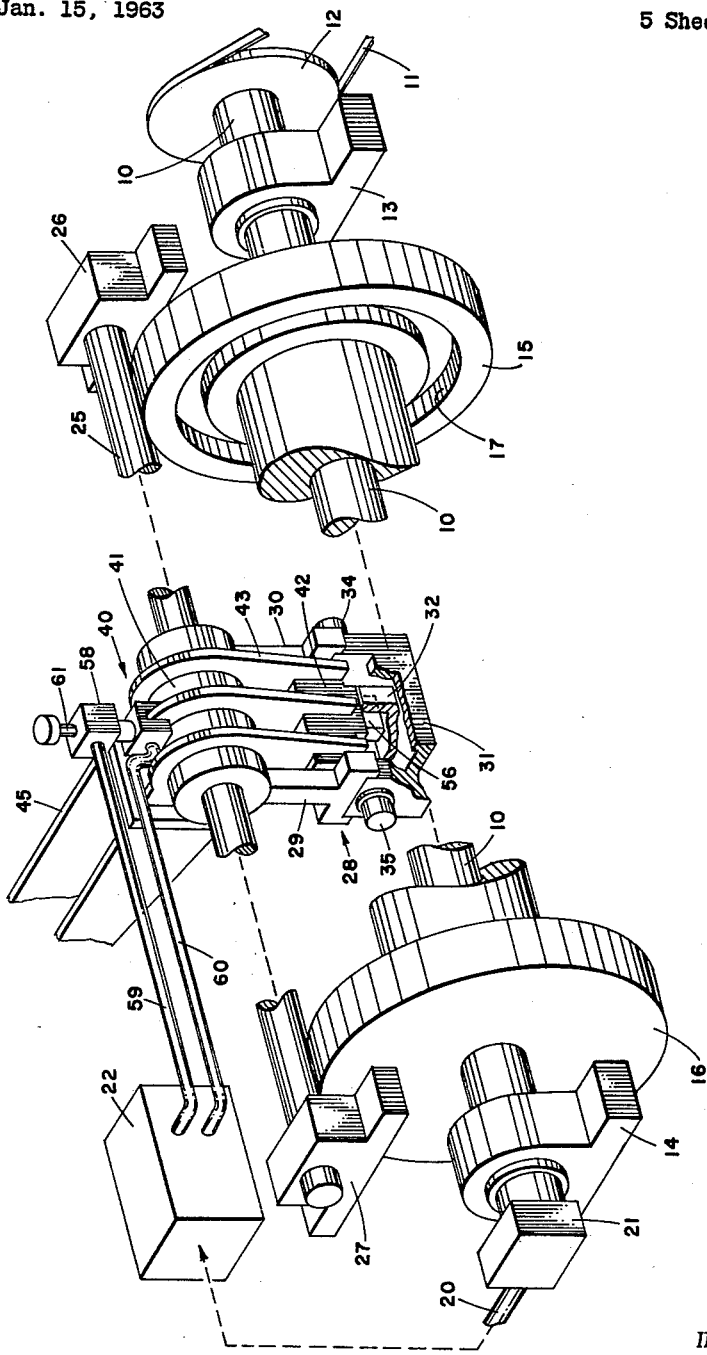
FIGURE 1 is a perspective, exploded and partially schematic view illustrating the overall organization of the system according to the invention.

Referring to FIGURES 1 and 2, there is provided according to the invention a main drive shaft 10 driven, via a belt 11 and pulley 12, by a motor, not shown. Shaft 10 is journalled in bearing blocks 13 and 14 and has fixed thereon two fly wheels 15 and 16 with respective opposing cam tracks 17 and 18. The distal end of shaft 10 drives a control shaft 20 via a gear train 21. Shaft 20 feeds position and related signals to a control and timing arrangement schematically illustrated at 22.

Disposed parallel to main shaft 10 is a support shaft 25 journalled in bearing blocks 26, 27. Rotatable on shaft 25 is a yoke structure 28 comprising two depending arms 29 and 30 having their lower ends joined by a bridge 31. Fixed in a recess in the bridge is a slotted key seat 32 while rotatably mounted on opposite side of the bridge are cam rollers 34 and 35 disposed in the respective cam tracks 17 and 18 of fly wheels 15 and 16. As the latter rotate, yoke 28 undergoes periodic oscillation around shaft 25 having a response characteristic which is dependent on the configuration of the cam tracks.

Fixedly mounted on shaft 25 in the region between the arms 29 and 30 of yoke 28, is a bell-crank assembly 40 including an engaging arm structure formed of a boss 41 and block 42 joined by three parallel plates 43; the other crank member comprises an output arm 45 generally orthogonal to arm 41, 42, 43. Output arm 45 of the bell crank is connected to a constraining strut 46 (FIGURE 3) on which is mounted the testing platform 50. Compensation for lack of perfect rigidity and related factors is provided by damping means schematically indicated at 51 and connected to arm 45. Strut 46 is generally constrained to substantially vertical movement by a guide rod 47 coaxial therewith.

A recess in block 42 of the bell crank engaging arm forms a slotted guide for a key 56. The latter is connected to an actuating rod 57 which passes vertically up through block 42 and shaft 25 to the piston of a hydraulic ram 58. The latter is fed by hydraulic pressure lines 59 and 60 from the control system 22 as more fully described hereinafter. Extending from ram 58 and connected to the piston thereof is an indicator rod 61 which reciprocates as the ram is actuated.

With ram 58 in the deenergized state, the cam-induced oscillatory action of yoke 28 has no effect on bell crank 40 nor on test platform 50 connected thereto; these latter elements are consequently stationary. However, properly timed actuation of ram 58 drives key 56 of the bell crank into key seat 32 of yoke bridge 31 whereupon the bell crank, shaft 25, and test platform 50 execute a substantially rectilinear and generally complex displacement of a nature controlled by the data represented and programmed in the cam tracks 17 and 18. This displacement-time relationship imposes the desired force on the object under test which is mounted on platform 50. At a requisite point in the cycle, the ram 58 pulls key 56 out of engagement with the yoke 28 and cam followers 34, 35 connected thereto whereupon activation of the object under test ceases. The control arrangement for effecting the foregoing action is described below.

The control arrangement as seen particularly in FIGURES 1, 4, is coupled, illustratively by direct connection of shaft 20 and gear drive 21, to main drive shaft 10. As seen in FIGURE 4, shaft 20 has fixed thereon a cam 70 which, with shaft 20, preferably rotates at a sub-multiple speed of main drive shaft 10, e.g., at ½ the speed thereof. Cam 70 periodically activates the spool 71 of a hydraulic valve controller 72 via a roller 73 rotatably mounted on the spool. The spool is urged upwardly by a spring, not shown. During machine rest period however, full upward movement of spool 71 is prevented by actuating means hereinafter described so that actuation of spool 71 by cam 70 is limited to a low amplitude oscillation or dither signal which improves response time but is insufficient to fully energize the valve 72 and hydraulic ram 58 connected thereto (via hydraulic lines 59 and 60).

Secured to the frame of the system adjacent cam 22 and valve 71 is a guide member 75, FIGURES 4, 9. Movably disposed in a longitudinal slot of guide 75 is a latch 76, FIGURES 4, 10 having one end pivoted to a lever 77 which is secured in turn to a shaft 78. Fast on the latter is a manual control arm 79 terminating in a control knob 80. Arm 79 may include a spring coupled section 81 which decouples knob 80 from the lower section of arm 79 after a certain displacement of knob 80 occurs. Also fast on shaft 80 is a remote control arm 82 adapted to be actuated by a solenoid 83 to provide remote starting.

The other end of latch 76 includes an integral extension 85 which abuts with clearance an engaging slide 86 FIGURES 4, 6 having fixed thereto a threaded shaft 87 arranged parallel to latch 76 and slidably disposed in a bore in guide 75. Coaxial with shaft 87 is a spring 90, biased between the guide 75 and slide 86. Spring 90 tends to urge the slide to the left, this action being limited by stop nut 88 on shaft 87. Slide 86 has secured to the underside thereof a replaceable heel piece 92 FIGURES 4, 8 which in the condition illustrated in FIGURE 4, interlocks with a mating heel piece 93 FIGURES 4, 7 secured to the valve spool 71.

During the rest period and with actuating shaft 78 undisturbed, slide 86 with its heel 92 remains in the position shown whereby the upward travel of spool 71 as it follows cam 70 is intercepted and limited to prevent full actuation of the hydraulic ram 58, FIGURES 1, 2.

To initiate a shock application, actuation shaft 78 is urged counterclockwise by manual displacement of knob 80 or remote actuation of solenoid 83. The shaft 78, and thus latch 76, is prevented from responding until, during the downward stroke of spool 71 under the action of cam 70, heel piece 93 moves out of interlocking engagement with heel piece 92. This occurs at a precise time in the machine cycle since shaft 20 is coupled to main shaft 10 FIGURES 1, 2. It is calibrated to occur at such time that when the valve 72 finally actuates ram 58, as described more fully hereinafter, the key seat of yoke 28 is in alignment with the ram-actuated key 56 in block 42 of the test platform bell crank assembly.

When members 92 and 93 are disengaged, the counter-clockwise pressure on shaft 78 displaces latch 76 to the right which similarly displaces guide 86 and its engaging member 92. As spool 72 now commences its upward stroke it is no longer stopped by members 86, 92; as a consequence valve 72 energizes ram 58 which drives key 56 and thus the test platform 50, into engagement with yoke 28 and its cam followers 34, 35. Under the control of the displacement-defining cam tracks, the test platform and any test object thereon executes the requisite response which applies the required acceleration and equilibrium forces thereto.

After the heel piece 93 on spool 71 clears the piece 92 on guide 86, heel 93 impacts latch 76, disengaging it from slide 86. Spring 90 thereupon displaces the slide to the left, and after temporary engagement with the side of member 93 during the remainder of the upward stroke and start of the downward stroke of spool 71, guide 86 returns to the position shown. This occurs when, on the downward stroke, heel 93 slides past member 92. Guide 86 is thus automatically returned to its limit position, locking out and preventing renewed actuation of valve 72 after it has been energized in the opposite direction to disengage the test platform during the down stroke of spool 71. This down stroke action charges the lower chamber of ram 58 which responds by withdrawing key 56 from its key seat. When actuating shaft 78 has been returned to its rest position, latch 76 is returned to the position shown and the system is in readiness for a new shock application.

As may be seen by a comparison with the patented structure, the above described arrangement represents substantial simplification with attendant improvements in reliability and durability, and decreased costs. The extensive control apparatus of the patented arrangement is eliminated along with the need to axially displace the cam follower apparatus. Improvements in response time are also effected.

The invention is not limited to the specific mechanisms shown and described but departures may be made therefrom within the scope of the accompanying claims without departing from the principles of the invention and without sacrificing its chief advantages.

What is claimed is:

1. Apparatus for applying a transient shock motion to an object comprising data storage means, the data representing motions to be imparted to said object independent of the mass and weight thereof, a member operatively coupled to said storage means and oscillated as a function thereof, object carrying means spaced from said member and adapted to hold said object, coupling means adapted in two different positions to interconnect and disconnect respectively, said oscillating member and said object carrying member, two-way actuator means coupled to said coupling means for positioning said coupling means to either of the desired of said two positions, control means for energizing said actuator means, and synchronizing means in synchronized connection with said oscillating member and said control means for disabling said control means except during a predetermined period of movement of said oscillating member.

2. Apparatus according to claim 1 in which said control means include a start member and a valve for energizing said two-way actuator means and said synchronizing means include a cam for actuating said valve and limit means coupled to said start member and said cam and effective to prevent actuation of said valve by said cam except when said cam has reached a predetermined position and said start lever has been energized.

3. Apparatus according to claim 1 in which said two-way actuator comprises a fluid-operated piston and said control means include a fluid valve for operating said piston.

4. Apparatus according to claim 1 in which said data storage means comprise a cam track, said oscillating member includes a cam follower controlled by said track, said coupling means comprise a key displaced by said two-way actuator and said object carrying means comprise a bell crank coaxially mounted with respect to said oscillating member and having one arm containing said key, into alignment with which said oscillating member periodically moves.

5. Apparatus for applying transient shock motion to an object independent of the mass and weight thereof comprising a fly wheel, a cam track in said fly wheel, a cam follower, object carrying means, fluid actuating means, coupling means responsive to said fluid actuating means for interconnecting said follower and said object carrying means to impart transient shock motion to said object, valve control means for energizing said fluid actuating means, and synchronizing means interconnecting said valve control means and said fly wheel for preventing actuation of said valve control means except when said follower and said object carrying means are in predetermined relationship.

6. Apparatus according to claim 5 in which said synchronizing means include a cam coupled to said fly wheel for continuously applying a periodic signal to said valve control means to coordinate system operation.

7. Apparatus according to claim 5 including a start member interlocked with said synchronizing means for actuating said valve control means, and reset means for returning said valve control means to the deactivated position after one cycle of energization of said fluid actuated means.

8. Apparatus for applying transient shock motion to an object independent of the mass and weight thereof comprising a fly wheel, a cam track in said fly wheel, a shaft, a follower arm pivoted at one end on said shaft and having at the other end a cam follower engaged in said cam track, a bell crank fixed to said shaft and having an output arm adapted to carry said object and an input arm paralleling said follower arm, a hydraulic ram on said input arm, an engaging member on said input arm connected to said ram and adapted to selectively engage said follower, and ram control means synchronized with said follower and operable upon actuation thereof at a predetermined time to energize said ram for connecting said input arm to said follower arm whereby the motion defined by said cam track is imparted to said object.

9. Apparatus for applying transient shock motion to an object independent of the mass and weight thereof comprising cam means for defining said motion, follower means operatively coupled to said cam means and oscillated as a function thereof, object-carrying means including engaging means movable with respect to said carrying means having a potential energy source, actuating means for energizing said engaging means whereby the latter interconnects said follower means and said object-carrying means and synchronizing means responsive to said cam means for disabling said actuating means except during predetermined periods of oscillation of said follower means.

10. Apparatus according to claim 9 in which said actuating means include a two-way hydraulic actuator.

11. Apparatus according to claim 9 in which said follower means comprise an oscillating yoke and said object carrying means comprise a bell crank having one arm disposed in spaced relationship within said yoke.

12. Apparatus according to claim 9 in which said cam means include kinetic energy storage means comprising a pair of fly wheels.

References Cited by the Examiner
UNITED STATES PATENTS

| | | | |
|---|---|---|---|
| 3,059,482 | 10/62 | Petzoldt | 74—53 |
| 3,073,148 | 1/63 | Muller | 73—12 |

RICHARD C. QUEISSER, *Primary Examiner.*

DAVID SCHOENBERG, *Examiner.*